July 3, 1962  H. BROSCHKE  3,041,951
PHOTOGRAPHIC CAMERA WITH BUILT-IN PHOTO-ELECTRIC
LIGHT METER COUPLED WITH CAMERA
ADJUSTING MEMBERS
Filed June 26, 1959  3 Sheets-Sheet 1
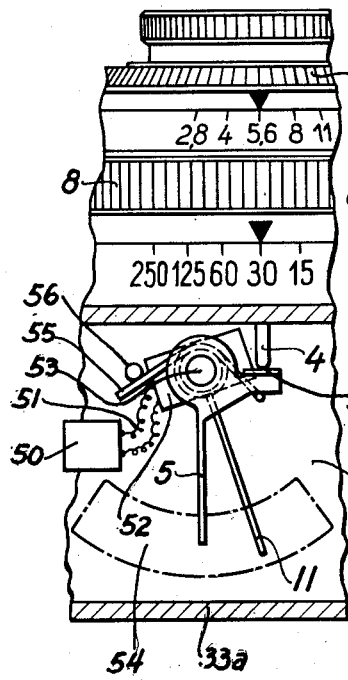
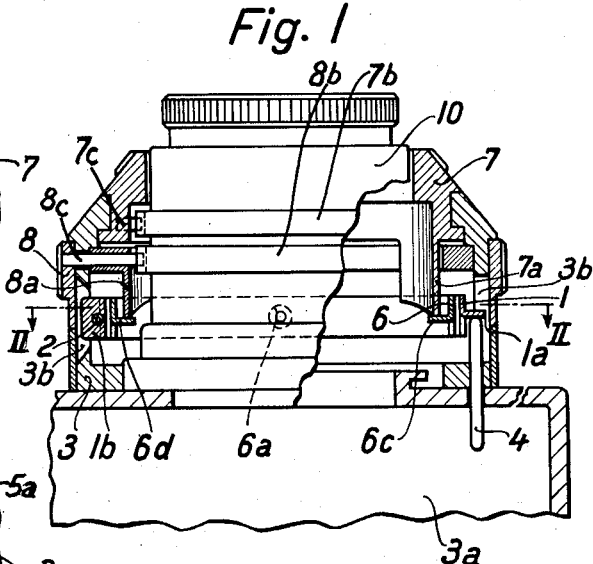
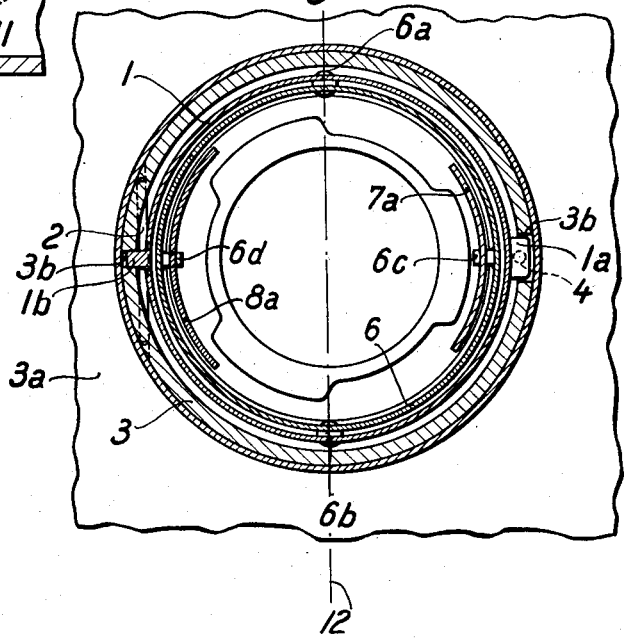
INVENTOR
HEINRICH BROSCHKE
BY Toulmin & Toulmin
ATTORNEYS July 3, 1962

H. BROSCHKE 3,041,951

PHOTOGRAPHIC CAMERA WITH BUILT-IN PHOTO-ELECTRIC
LIGHT METER COUPLED WITH CAMERA
ADJUSTING MEMBERS

Filed June 26, 1959

INVENTOR
HEINRICH BROSCHKE
BY Toulmin & Toulmin

ATTORNEYS

July 3, 1962
H. BROSCHKE
3,041,951
PHOTOGRAPHIC CAMERA WITH BUILT-IN PHOTO-ELECTRIC
LIGHT METER COUPLED WITH CAMERA
ADJUSTING MEMBERS
Filed June 26, 1959
3 Sheets-Sheet 3
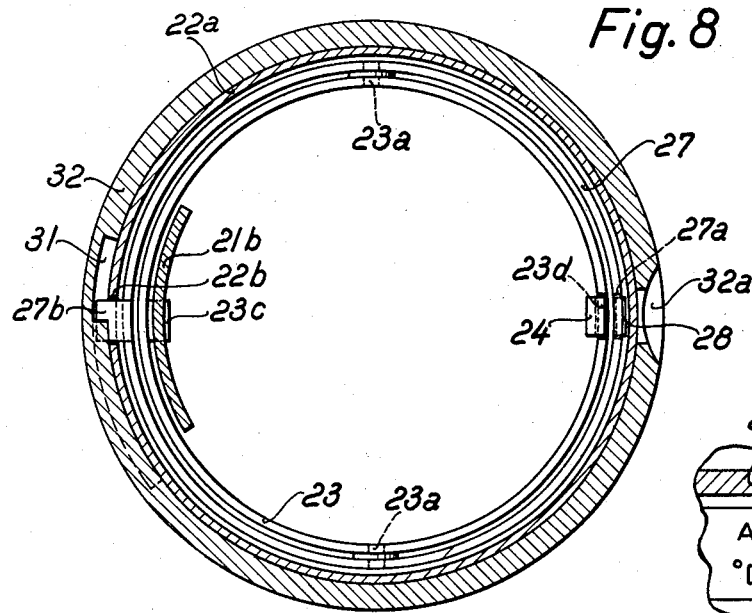
Fig. 8
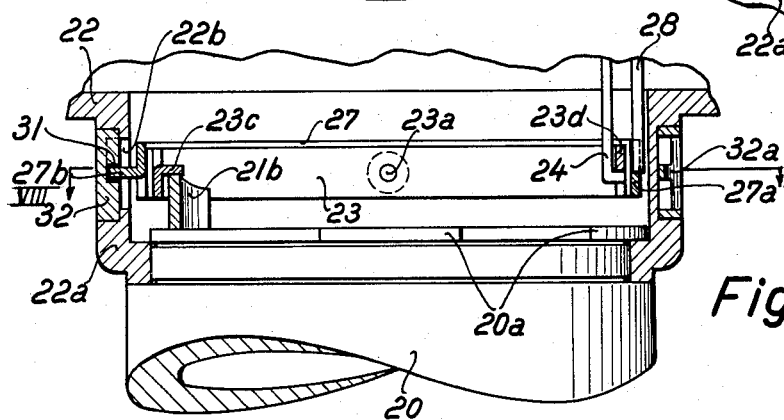
Fig. 9
Fig. 7
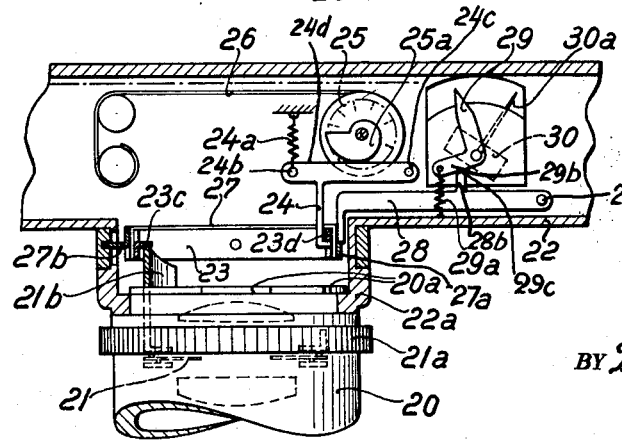
Fig. 6
INVENTOR
HEINRICH BROSCHKE
BY Toulmin & Toulmin
ATTORNEYS United States Patent Office 3,041,951
Patented July 3, 1962

3,041,951
PHOTOGRAPHIC CAMERA WITH BUILT-IN PHOTO-ELECTRIC LIGHT METER COUPLED WITH CAMERA ADJUSTING MEMBERS
Heinrich Broschke, Wetzlar (Lahn), Germany, assignor to Ernst Leitz G.m.b.H., Optische Werke, Wetzlar (Lahn), Germany
Filed June 26, 1959, Ser. No. 823,159
Claims priority, application Germany June 27, 1958
6 Claims. (Cl. 95—10)

The present invention relates to photographic cameras. More in particular, the present invention relates to a photographic camera of the type having a built-in light meter which is in mechanical coupling connection with the setting members for adjusting the opening width of the diaphragm and the time of exposure.

In the known cameras of the type referred to, the adjustment of a time of exposure-opening width of the diaphragm relation, hereinafter referred to as "exposure time-diaphragm" relation is done by a follow-up pointer in the light meter which pointer is adjusted to coincide with the indicated value of the electric light meter. A mechanical coupling connection between the exposure time and the diaphragm adjustment members, on the one hand, and the follow-up pointer, on the other hand, is effected by a differential gear or a differential lever system.

These known differential gears or differential lever system are rather complicated and expensive due to the small space available for the differential system whose elements must, therefore, be very small and must be precision-made in order to operate with the necessary degree of accuracy.

It is an object of the present invention to provide a coupling member for a photographic camera with a built-in photo-electric light meter which coupling is designed to effect a differential connection between the exposure time and diaphragm adjusting members, and the follow-up pointer, and which is comparatively simple and inexpensive to produce but simultaneously operates with a particularly high degree of accuracy.

It is another object of the present invention to provide a coupling member for a photographic camera with a built-in photo-electric light meter, which coupling is designed to effect a differential connection between the exposure time and diaphragm adjusting members, and the follow-up pointer, and which is manufactured of comparatively great and simple elements.

It is a further object of the present invention to provide a coupling member for a photographic camera with a built-in photo-electric light meter, which coupling is designed to effect a differential connection between the exposure time and diaphragm adjusting members, and the follow-up pointer, and which is particularly suitable for cameras with exchangeable objectives.

These objects are achieved by the coupling system in the photographic camera of the present invention which consists of a differential lever system whose levers consist of two rings which are concentrically disposed relative to the optical axis of the objective.

According to a first embodiment of the present invention, the exposure time and diaphragm adjusting members each separately actuate the same annular lever, while the coupling member connected with the follow-up pointer actuates the other annular lever.

According to another, preferred embodiment of the present invention, the exposure time adjusting member actuates one annular lever and the diaphragm adjusting member actuates the other annular lever, while one of the aforementioned adjusting members (that is, either the exposure time adjusting member or the diaphragm adjusting member) as well as the coupling member connected with the follow-up pointer actuate one of the two annular levers. In other words, the coupling member connected with the follow-up pointer may either actuate the annular lever actuated by the exposure time adjusting member, or it may actuate the annular lever actuated by the diaphragm adjusting member.

The invention will be better understood upon the following detailed description of the accompanying drawings, wherein, FIGURE 1 is a partly sectional top view of the objective portion of a camera having a central shutter and a built-in light meter, and illustrates the differential lever system of the basic embodiment of the invention wherein the exposure time in the diaphragm adjusting members both actuate one annular lever whereas the coupling member connected with the follow-up pointer actuates the other annular lever;

FIGURE 2 is a sectional view of the embodiment of the invention shown in FIGURE 1, taken along lines II—II in FIGURE 1;

FIGURE 3 is a partly sectional top view of the objective of the diaphragm and exposure time adjusting members, and shows, as a detailed view of the embodiment shown in FIGURES 1 and 2, the connection of the follow-up pointer for the light meter with the annular lever differential system;

Figure 4:
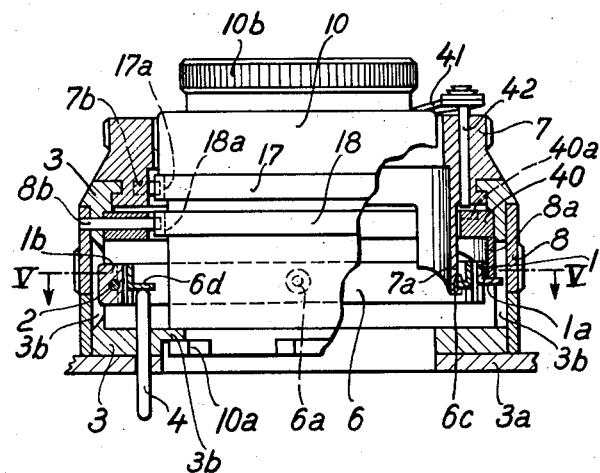
Figure 5:
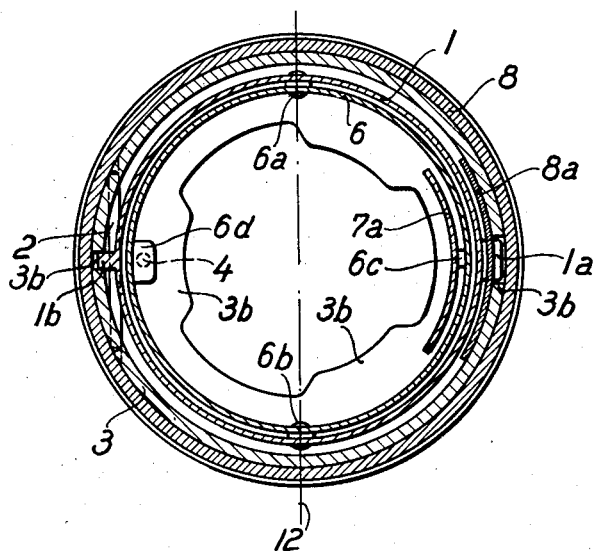

FIGURE 4 is a partly sectional top view of the objective portion of a camera with a built-in light meter and an exchangeable objective having a central shutter and shows the preferred embodiment of the differential lever system of the invention, wherein the exposure time adjusting member actuates one of the two annular levers, whereas the diaphragm adjusting member actuates the other of the two annular levers;

FIGURE 5 is a sectional view of the embodiment of the invention shown in FIGURE 4 taken along lines V—V in FIGURE 5;

FIGURE 6 is a partly sectional top view of the objective portion of a camera having a slit-type shutter and a built-in light meter, with the differential annular lever system of the present invention;

FIGURE 7 is a partly sectional, enlarged view of the lower part of FIGURE 6 showing the annular levers in section;

FIGURE 8 is a sectional view of the embodiment of the invention shown in FIGURES 6 and 7, taken along lines VIII—VIII in FIGURE 7;

FIGURE 9 is a detailed front view of the reading window portion shown in section in FIGURE 7.

Referring now to the drawings more in detail and turning first to FIGURES 1 and 2, the camera has an objective 10 with a conventional central shutter. The objective 10 is mounted in a support ring 3 which latter is attached to the front wall 3a of the camera casing. The objective has a diaphragm adjusting ring 7 with a downwardly extending curved portion 7a. The objective is further provided with an exposure time adjusting ring 8 having a curved portion 8a. The diaphragm adjusting ring 7 is coupled with the diaphragm setting member 7b by means of coupling link 7c, and the exposure time adjusting ring 8 is coupled with the exposure time setting member 8b by means of the coupling member 8c.

The first, exterior annular lever 1 of the differential lever system is mounted in the support ring 3 by means of a support pin 2. It is disposed concentrically with respect to the longitudinal axis of the objective and can be displaced in the direction of the latter axis. The annular lever 1 has a projecting cam portion 1a which is in contact with one end of an intermediary pin 4. This pin extends parallel relative to the optical axis of the objective 10. Its other end is in contact with the contact surface 5a of the follow-up pointer 5 of the built-in electric light meter. The photoelectric light meter has a photo-cell 50 connected via wires 51 with rotor coil 52 which latter is rotatably mounted on shaft 53. This shaft 53 also bears the instrument pointer 11, the extreme end of which appears below a window 54. The shaft 53 furthermore bears the aforementioned follow-up pointer 5 having a pressure spring 55, the one end of which rests against bolt 56 and the other end of which presses the follow-up pointer 5 with its contact surface 5a against the intermediary pin 4, thus pressing the other end of this pin 4 against the cam portion 1a of the exterior annular lever 1. Thus, there is established a coupling between the annular lever 1 and the follow-up pointer 5 and it is further possible to transfer movement from the annular lever 1 to the follow-up pointer 5 and vice versa.

A second annular lever 6 is disposed concentrically with respect to the optical axis of the objective 10 and between the latter and the exterior annular lever 1. This inner annular lever 6 is mounted on the shafts 6a, 6b and can also be pivoted around shaft 6a, 6b in the direction of the optical axis of the objective 10.

The second, interior annular lever 6 bears two projecting portions 6c and 6d. The projecting portion 6c is in contact with the contact surface of the curved portion 7a of the diaphragm adjusting member 7. The projecting portion 6d of the interior annular lever 6 is in contact with the contact surface of the curved member 8a of the exposure time adjusting member 8. One of the projecting portions 6c and 6d is located at one side of an imaginary line 12 connecting the respective centers of shafts 6a, 6b, whereas the other one of the projecting portions is located at the other side of this line 12. As long as one of the projecting portions is thus located at one side and the other is located on the other side of this line 12 the particular position of portions 6c and 6d is immaterial. The relative distance of the projecting portions 6c and 6d from this line 12 determines the transmission ratio of the differential lever system.

As shown in FIGURES 1, 2, the curved portion 7a is connected with the diaphragm adjusting member 7. In the case where the objective is exchangeable and objectives with different light intensities are used, this calls for an adjusting range in the diaphragm adjusting member 7 with its curved portion 7a, comprehending all possible light intensities and diaphragm adjusting positions.

Another, preferred embodiment of the invention is shown in FIGURES 4 and 5. The camera has an exchangeable objective 10 with a central shutter comprising the range adjusting ring 10b, the diaphragm adjusting ring 17, the exposure time adjusting ring 18, and the bayonet tongues 10a. The objective support ring 3 is firmly attached to the front wall 3a of the camera thereby forming a part of the camera housing and has a bayonet catch 3b. The objective 10 has bayonet tongues 10a adapted to enter the bayonet catch 3b, thereby fixing the exchangeable objective 10 to the camera. The objective has an adjusting ring 10b with which the objective is focused. The objective further has a diaphragm adjusting ring 17 associated with a diaphragm adjusting member 7, and exposure time adjusting ring 18 associated with an exposure time adjusting member 8. The diaphragm adjusting ring 17 has a coupling recess 17a, and the adjusting member 7 has a coupling projection 7b. The exposure time adjusting ring 18 has a similar coupling recess 18a, and the adjusting member 8 has a coupling member 8b.

When exchanging the objective 10, the new objective is affixed to the support 3 being part of the camera housing, by means of bayonet catch 10a, 3b, whereupon the objective is coupled with the adjusting members 7 and 8 via the coupling projection 7b and the coupling member 8b, respectively, entering the corresponding recesses 17a and 18a, respectively. In particular, the bayonet tongues 10a engage behind the bayonet catch 3b.

The camera further has annular levers 1 and 6 just as shown in FIGURES 1 and 2, with projecting cam portions 1a and 6c, and a photo-electric light meter with the follow-up pointer 5 as shown in FIGURE 3. However, differently from the basic embodiment of the invention shown in FIGURES 1 and 2, the diaphragm adjusting member 7 has an adjusting curved portion 7a which is in contact with the projecting cam portion 6c of the interior annular lever 6, whereas the projecting cam 6d of the annular lever 6 at the other side of line 12 is in contact with the adjusting pin 4, which is in contact with surface 5a of the follow-up pointer 5, as previously described. The adjusting curved portion 8a of the exposure time adjusting member 8 is in contact with the projecting cam portion 1a of the exterior annular lever 1.

Furthermore, there is provided a coupling ring 40 disposed between the diaphragm adjusting ring 7 and the exposure time adjusting ring 8 which is in connection with the coupling member 8b of the exposure time adjusting ring 8. The coupling ring 40 is firmly connected with the curved portion 8a, and is firmly connected with the adjusting ring 8 by way of coupling member 8b. The coupling ring 40 is provided with coupling jaws 40a adapted to receive a coupling bolt 42. The coupling bolt 42 is positioned in the diaphragm adjusting ring 7, and thus follows the movements of the latter ring 7 upon actuation thereof. The bolt 42 is influenced by a blade spring 41 which tends to keep the coupling bolt 42 out of contact with the coupling jaw 40a of the coupling ring 40.

The use of the differential lever system described with reference to FIGURES 1 through 5 is not confined to cameras with a central shutter, but can equally be employed with cameras having other types of shutters. For example, it can be adapted for use with a camera having a slit-type shutter, as shown by way of example in FIGURES 6 through 9 of the drawings, which will next be described. The camera has an objective 20 with an iris shutter 21. The objective is exchangeably connected with stud 22a of the front wall 22 of the camera casing by means of a bayonet catch 20a. The iris diaphragm 21 is adjusted by means of the adjusting ring 21a in a manner known per se. The adjusting ring 21a is connected with a curved adjusting member 21b, which latter is in contact with the projecting cam portion 23c of the interior annular lever 23 which can be swivelled about shaft 23a. The curved member 21b is exchanged together with the objective 20 and comes into contact with the annular lever 23 only after the objective 20 has been fixed to stud 22a by means of the bayonet catch.

The portion 23d of the annular lever 23 opposite to cam 23c is in contact with an angular lever 24, fulcrumed at 24b and 24c and connected at one end with a spring 24a, tending to keep the interior annular lever 23 in communication with the exposure time adjusting member 25 via the angular lever 24 and the curved member 25a. The opposite end of spring 24a is fixed to the camera casing. The surface 24d of the angular lever 24 is in contact with the curved adjusting member 25a, which latter is connected with the exposure time adjusting member 25 of the slit-type shutter 26 provided in the interior of the camera.

The exterior annular lever 27 has a portion 27a which is in contact with a further angular lever 28 fulcrumed at 28a. The angular lever 28 has a nose portion 28b which nose portion is in contact with the control surface 29c of the lower arm 29b of the angular follow-up pointer 29 of the photo-electric light meter 30. The extreme end of the lower arm 29b of follow-up pointer 29 is connected to one end of a spring 29a, the other end of which spring is fixed to the interior of front wall 22 of the camera casing, tending to keep the exterior annular lever 27 in communication with the follow-up pointer 29 via the angular lever 28, nose portion 28b, and control surface 29c. The portion of the annular lever 27 opposite to its portion 27a bears the projecting cam portion 27b which is guided in a slot 22b in the camera casing and which enters, with a slight play, into the curved groove 31 of a ring 32 which latter is rotatably positioned on a stud 22a fixed to the camera casing. The ring 32 has a reading window 32a between which there appear numbers disposed on the circumference of stud 22a and which numbers are representative of further exposure factors such as, for example, sensitivity of the film material, filter values and the like. Different numbers appear between the window 32a as the ring 32 is turned. (See FIGURES 7 and 9.)

The operation of the apparatus of the invention will next be described in detail with reference to the basic embodiment shown in FIGURES 1 and 2. A predetermined opening width of the diaphragm of the camera is chosen by turning the diaphragm adjusting ring 7. Thereby, the interior annular lever 6 is swivelled through the curved member 7a connected with diaphragm adjusting ring 7, in the direction of the optical axis of objective 10. Since the interior annular lever 6 is in contact with the curved member 8a of exposure time adjusting ring 8 with its cam portion 6d which is swivelled also along the optical axis of objective 10 but in opposite direction, the exterior annular lever 1 is swivelled about pin 2 in the objective support member 3. If now the exposure time adjusting ring 8 is turned, the interior annular lever 6 is retained in its position by the curved member 7a of the diaphragm adjusting ring 7 pressed against cam 6c of annular lever 6, whereas it can be swivelled by curved member 8a of diaphragm adjusting ring 8 attacking at cam 6d. The displacement of the portion of annular lever 6 bearing the cam 6d is transferred to the exterior annular lever 1 through portion 8a of exposure time adjusting ring 8. The exterior annular lever 1 thus swivels about pin 2 in the objective support member 3. The displacement of the exterior annular lever 1 is transferred to the follow-up pointer 5 through the coupling member 4 actuating the contact surface 5a of pointer 5.

After a predetermined opening width of the diaphragm has been chosen the exposure time adjusting ring 8 must be turned, until the follow-up pointer 5 coincides with the instrument pointer 11 of the photoelectric light meter. For each particular position of the instrument pointer 11 of the light meter there is a corresponding oblique position of annular lever 1. By means of the interior ring 6 with its cam portions 6c and 6d it is thus possible to adjust the diaphragm adjusting ring 7 to the light value as indicated by instrument pointer 11 or to adjust the exposure time adjusting ring 8 to this light value.

The preferred embodiment of the invention shown in FIGURES 4 and 5 operates in an entirely analogous manner as the basic embodiment with the following exceptions: In the preferred embodiment, the diaphragm adjusting ring 7 actuates the interior annular lever 6 through the curved member 7a and cam 6c, and the cam 6d of annular lever 6 actuates follow-up pointer 5 via coupling member 4. The exposure time adjusting ring 8 actuates the exterior annular lever 1 through the curved member 8a and cam 1a. By turning diaphragm adjusting ring 7 and exposure time adjusting ring 8, thereby effecting the adjustment of diaphragm exposure time via adjusting members 17 and 18 of the objective, the follow-up pointer 5 is made to coincide with instrument pointer 11 via the annular levers 1, 6, thereby setting diphragm and exposure time corresponding to the light value as indicated by instrument pointer 11. Exposure time and diaphragm can be simultaneously adjusted by pressing blade spring 41, thereby connecting coupling bolt 42 with one of the coupling jaws 40a of coupling ring 40. By turning the diaphragm adjusting ring 7 exposure time and diaphragm can thus be simultaneously adjusted. The relation of the exposure time values and the diaphragm values to the adjusting rings 7 and 8 is counter-current, that is, in the end positons of adjusting rings 7 and 8 the smallest possible exposure time corresponds to the greatest opening width of the diaphragm whereas in the other end positions the smallest opening width of the diaphragm corresponds to the longest time of exposure. By simultaneously adjusting the exposure time and diaphragm rings it is possible to obtain predetermined exposure time/diaphragm combinations, while retaining the light value indicated by the instrument pointer 11. After de-coupling the adjusting rings 7 and 8 each of the latter separately actuates the follow-up pointer 5 of the light meter.

The embodiment of the invention shown in FIGURES 6 through 9 relating to a camera with a slit-type shutter operates in an analogous manner. The diaphragm adjusting motion of the diaphragm adjusting ring 21a is transferred to the annular lever 23 via the curved adjusting member 21b and the projection 23c. Consequently, the annular lever 23 is swivelled about the end where portion 23d contacts angular lever 24. Annular lever 23 takes annular lever 27 by its shaft stud 23a, thereby swivelling lever 27 about projection 27b. The displacement of annular lever 27 is transferred to follow-up pointer 29 by means of angular lever 28.

If the exposure time is adjusted by turning adjusting member 25, angular lever 24 is displaced via curved adjusting member 25a. As annular lever 23 is kept in contact with angular lever 24 by springs 24a, 29a at its portion 23d, it follows the displacement of angular lever 24 and swiveis about portions 23d, 21b. This swivelling motion is transferred to the follow-up pointer 29 via shaft stud 23, annular lever 27 and angular lever 28. The correct position is obtained as soon as follow-up pointer 29 has been made to coincide with instrument pointer 30a by turning diaphragm adjusting ring 21a and exposure time adjusting member 25.

It is also possible to effect an adjustment taking into consideration additional exposure factors such as, for example, film sensitivity, filter factors and the like. This is done by turning the ring 32 until the desired values appear in the window 32a. The movement of ring 32 is transferred to annular lever 27 via recess 31 and projection 27b. The movement of annular lever 27, is, in turn, transferred to the follow-up pointer 29 via the angular lever 28.

The present invention offers considerable advantages over the art. First of all, the comparatively long lever arms of the differential lever system render its operation extremely accurate. Furthermore, the elements composing the differential lever system, particularly the annular levers can be produced in a simple manner and at very low cost; in particular their size has been greatly reduced as compared with the corresponding elements of the coupling systems used hereinbefore. In addition, the differential lever system and its operation are particularly suitable for cameras with exchangeable objectives; the use of annular levers in the coupling system of the invention makes it possible to easily introduce a new objective into the annular levers without requiring a further and complicated adaptation of the camera construction.

It will be understood that this invention is susceptible to modification in order to adapt it to different usages and conditions and, accordingly, it is desired to comprehend such modifications within this invention as may fall within the scope of the appended claims.

What I claim is:

1. In a photographic camera, having an objective and a built-in photo-electric light meter with an instrument pointer and a follow-up pointer, the combination, comprising: an exposure time adjusting member and a first curved adjusting member associated therewith for common movement; a diaphragm adjusting member and a second curved adjusting member associated therewith for common movement; a differential lever system arranged in a tubular housing of said camera and comprising; a first ring defining a one arm lever arranged inside said housing and pivotally connected therewith, a second ring arranged inside said first ring, a first and a second shaft stud for pivotally interconnecting said first and second rings, defining a two arm lever, said first and said second ring surrounding the objective of said camera, means cooperating with two of said lever arms for respectively engaging said curved adjusting members associated with said exposure time and diaphragm adjusting members, and means cooperating with the remaining lever arm for transmitting the setting steps of said adjusting members to the follow-up pointer of said light meter.

2. In a photographic camera having a built-in photoelectric light meter with an instrument pointer and a follow up pointer, and a tubular housing for receiving an objective, the combination comprising: an exchangeable objective in said tubular housing and having a between-lens-shutter-unit, a diaphragm adjustment member and an exposure time adjustment member; a first curved adjusting member; releasable means for linking said diaphragm adjustment member to said first curved member, a second curved adjustment member; releasable means for linking said exposure time adjustment member to said second curved member; a first ring pivoted in said housing defining an annular one arm lever; a second ring concentrical with said first ring; means for pivotally supporting said second ring in said first ring, said second ring surrounding said objective and defining an annular two-arm lever, there being altogether three interlinked lever arms, said first and second curved members engaging two of said lever arms; and means for linking said follow up pointer to the third lever arm.

3. A device in a photographic camera as described in claim 1 and having an exchangeable objective and a shutter means arranged into the camera housing and comprising a cam and link means connecting said shutter means with one of said rings of said differential lever system, the diaphragm adjusting member of said objective being provided with a cam exchangeable together with said objective and adapted for coacting with one of said rings of said differential lever system, when said objective is inserted into said tubular housing for being fixed with said camera.

4. A device as described in claim 3, in which said first annular lever is provided with a radially extending stud, the said tubular housing having an axially extending slot and a third ring pivotally arranged on said housing and provided with a cam slot, said radially extending stud engaging said axially extending slot and said cam slot for connecting said first ring with said housing and adapting said first ring to be turned about said stud held into said axial slot and said cam slot, said stud being movable in axial direction by turning the said third ring on said housing for inserting additional exposure factors in the said differential lever system.

5. A device as described in claim 4 in which said third ring is provided with a window and said housing is provided with scale means visible through said window and indicating said additional exposure factors to be inserted in the differential lever system by turning said third ring.

6. In a photographic camera, having an objective and a built-in photoelectric light meter with an instrument pointer and a follow-up pointer, the combination, comprising: an exposure time adjusting member and a first curved adjusting member associated therewith for common movement; a diaphragm adjusting member and a second curved member associated therewith for common movement; a differential lever system arranged in a tubular housing of said camera and comprising: a first ring shaped member pivoted in said housing and defining a one arm lever; a second ring disposed in said first ring in concentric relationship thereto, and surrounding said objective; means for pivotally mounting said second ring in said first ring permitting pivot motion about an axis parallel to the pivot axis of said first lever, said second ring defining a double arm lever; first means for providing an engagement of said first ring remote from said pivot point with one of said exposure time adjusting member, follow-up pointer, and diaphragm adjusting member; second means for providing engagement of one arm of said second ring with a second one of said exposure time adjusting member, follow-up pointer and diaphragm adjusting member, and third means for providing engagement of the other arm of said second ring with the remaining one of said exposure time adjusting member, follow-up pointer, and diaphragm adjusting member.

References Cited in the file of this patent
UNITED STATES PATENTS

| | | |
|---|---|---|
| 2,252,573 | Leitz | Aug. 12, 1941 |
| 2,305,294 | Kuppenbender | Dec. 15, 1942 |
| 2,418,370 | Simmon | Apr. 1, 1947 |
| 2,887,026 | Rentschler | May 19, 1959 |